(12) United States Patent
Dicke et al.

(10) Patent No.: US 9,168,801 B2
(45) Date of Patent: Oct. 27, 2015

(54) TRANSVERSE LINK MADE OF FIBRE-REINFORCED PLASTICS MATERIAL FOR A WHEEL SUSPENSION OF A VEHICLE

(71) Applicant: Gestamp Umformtechnik GmbH, Bielefeld (DE)

(72) Inventors: Thomas Dicke, Bielefeld (DE); Mathias Buchholz, Bielefeld (DE); Leslie Leimkuhler, Bielefeld (DE); Matthias Kroeger, Hille (DE); Ulf Sudowe, Georgsmarienhutte (DE); Thomas Gross, Gutersloh (DE)

(73) Assignee: Gestamp Umformtechnik GmbH, Bielefeld (DE)

( * ) Notice: Subject to any disclaimer, the term of this patent is extended or adjusted under 35 U.S.C. 154(b) by 0 days.

(21) Appl. No.: 14/164,765

(22) Filed: Jan. 27, 2014

(65) Prior Publication Data
US 2014/0210177 A1    Jul. 31, 2014

(30) Foreign Application Priority Data
Jan. 28, 2013    (EP) .................................... 13152882

(51) Int. Cl.
*B60G 7/00*    (2006.01)
*B29C 43/18*   (2006.01)

(52) U.S. Cl.
CPC .............. *B60G 7/001* (2013.01); *B29C 43/18* (2013.01); *B60G 2206/014* (2013.01); *B60G 2206/124* (2013.01); *B60G 2206/7101* (2013.01); *B60G 2206/7104* (2013.01); *B60G 2206/8101* (2013.01); *B60G 2206/8102* (2013.01)

(58) Field of Classification Search
CPC .................................................. B60G 2206/124
USPC ..................................................... 280/124.134
See application file for complete search history.

(56) References Cited

U.S. PATENT DOCUMENTS

| | | | |
|---|---|---|---|
| 5,155,147 A | | 10/1992 | Dietz et al. |
| 5,516,129 A | * | 5/1996 | Kurosu et al. .......... 280/124.134 |
| 5,556,081 A | | 9/1996 | Miura et al. |
| 5,662,348 A | * | 9/1997 | Kusama et al. ........ 280/124.134 |
| 6,113,058 A | * | 9/2000 | Iwasaki ......................... 248/678 |

(Continued)

FOREIGN PATENT DOCUMENTS

| | | |
|---|---|---|
| DE | 2651665 A1 | 5/1978 |
| DE | 3841310 C1 | 6/1990 |

(Continued)

*Primary Examiner* — Nicole Verley
(74) *Attorney, Agent, or Firm* — The Webb Law Firm

(57) ABSTRACT

A transverse link made of fiber-reinforced plastics material for a wheel suspension, which transverse link is pivotable on its bearing elements about a common pivot axis or axes running substantially coaxially with respect to one another, these bearing elements being connected by a single-shell connecting element having connecting arms to a bearing element having a ball and socket joint bearing. The bearing elements and the connecting element are elements of an integral plastics material. In order to produce a transverse link of this type, disclosed is an integral plastics material moulded part produced by extrusion of plastics, the bearing elements having bearing bushes shells surrounded by extrusion of the plastics material. The ball and socket joint bearing have a bearing bush or a shell-shaped sliding capsule, produced from plastics material and connected to the connecting element, the connecting element comprising a centre or transverse web connecting the bearing elements.

17 Claims, 3 Drawing Sheets

(56) References Cited

U.S. PATENT DOCUMENTS

| | | | |
|---|---|---|---|
| 6,810,586 B1 * | 11/2004 | Waaler et al. | 29/897.2 |
| 7,850,182 B2 * | 12/2010 | Jang et al. | 280/124.134 |
| 8,025,301 B2 * | 9/2011 | Guttilla et al. | 280/124.134 |
| 8,616,570 B2 * | 12/2013 | Mielke et al. | 280/124.134 |
| 8,651,504 B2 * | 2/2014 | Gerhards et al. | 280/124.134 |
| 8,783,702 B2 * | 7/2014 | Lee et al. | 280/124.134 |
| 8,870,202 B2 * | 10/2014 | Teijeiro Castro et al. | 280/124.106 |
| 2004/0131418 A1 | 7/2004 | Budde et al. | |
| 2010/0237580 A1 * | 9/2010 | Vortmeyer et al. | 280/124.134 |
| 2013/0328283 A1 * | 12/2013 | Korte et al. | 280/124.134 |

FOREIGN PATENT DOCUMENTS

| | | | | |
|---|---|---|---|---|
| DE | 19745909 | A1 | 4/1999 | |
| DE | 19923699 | A1 | 11/2000 | |
| DE | 10155490 | A1 | 5/2003 | |
| DE | 10223118 | B4 | 12/2003 | |
| DE | 102004009722 | * | 9/2005 | B60G 7/00 |
| DE | 102007003596 | A1 | 7/2008 | |
| DE | 202007001892 | U1 | 7/2008 | |
| DE | 102009014194 | * | 9/2010 | B60G 7/00 |
| DE | 102010018903 | * | 12/2010 | B60G 7/00 |
| DE | 102011000105 | A1 | 8/2011 | |
| DE | 102011010367 | * | 8/2012 | B60G 7/00 |
| DE | 102011010367 | A1 | 8/2012 | |
| EP | 0637520 | A2 | 2/1995 | |
| EP | 0637520 | B1 | 2/1995 | |
| EP | 0874170 | A1 | 10/1998 | |
| EP | 1368205 | A1 | 12/2003 | |
| EP | 2527231 | A2 | 11/2012 | |
| FR | 2825763 | A1 | 12/2002 | |
| JP | 230363 | A | 1/1990 | |
| JP | 231906 | A | 2/1990 | |
| JP | 259326 | A | 2/1990 | |
| JP | 1070205 | A | 3/1998 | |
| JP | 2000355206 | A | 12/2000 | |
| WO | 2012107272 | A1 | 8/2012 | |
| WO | WO 2012107272 | A1 * | 8/2012 | B60G 7/09 |

* cited by examiner

TRANSVERSE LINK MADE OF FIBRE-REINFORCED PLASTICS MATERIAL FOR A WHEEL SUSPENSION OF A VEHICLE

CROSS-REFERENCE TO RELATED APPLICATION

This application claims priority to European Patent Application No. 13 152 882.0 filed Jan. 28, 2013, the disclosure of which is hereby incorporated by reference in its entirety.

BACKGROUND OF THE INVENTION

1. Field of the Invention

The invention relates to a transverse link made of fibre-reinforced plastics material for a wheel suspension of a vehicle, which transverse link is pivotable on at least two of its bearing elements about a common pivot axis or about pivot axes running substantially coaxially with respect to one another, these at least two bearing elements being connected by a single-shell connecting element having at least two connecting arms to at least one bearing element having a ball and socket joint bearing, the bearing elements and the connecting element being elements of an integral plastics material moulded part.

2. Description of Related Art

Numerous wheel suspensions for motor vehicles are known, which have variously configured links, in particular transverse links. When configuring links of this type, different goals have to be taken into account which, however, partly oppose one another. Thus, the link of a wheel suspension should preferably have as low a weight as possible in order to reduce the vehicle weight and therefore the fuel consumption. On the other hand, the link has to have an adequately high stability, in particular flexural rigidity, so it reliably withstands the dynamic loads during driving operation. Moreover, economical aspects generally have to be taken into account, which require production of the link, in particular mass production, which is as simple and economical as possible.

A transverse link for a wheel suspension is known from DE 199 23 699 A1, which has a substantially T-shaped basic body, on the end portions of which a respective bearing point is configured. The basic body is manufactured here integrally as a lightweight casting made of light metal, preferably aluminium or magnesium. The die casting method used here makes it possible to simultaneously also configure the bearing points in the form of bearing eyes integrally with the basic body. The basic body in this case has a substantially double-T shaped cross-sectional profile along broad areas.

Furthermore, transverse links are also mentioned in DE 199 23 699 A1, which consist of two steel sheet shells welded to one another and are therefore configured as hollow bodies. These known transverse links made of steel sheet are, however, relatively heavy and additionally relatively expensive to produce.

A transverse link for a wheel suspension is proposed in EP 1 368 205 B1, which it should be possible to produce easily and economically with a low weight. The transverse link disclosed there is a welded construction and comprises at least two bearing elements and a single-shell connecting element connecting the bearing elements to one another. The connecting element is formed from an integral web connecting the bearing elements and at least one flange, which is fastened to said web by a weld seam on an edge of the web. The web is substantially placed at a right angle on the flange, the flange or flanges extending up to the bearing elements. The web and the at least one flange welded thereto preferably consist of steel sheet. Furthermore, it is mentioned in EP 1 368 205 B1 that the web and/or the flanges can alternatively also be produced from a plastics material or a fibre composite material.

A transverse link of the type mentioned at the outset produced from fibre-reinforced plastics material is known from EP 0 637 520 B1. The known transverse link has a wheel-side bearing element for articulated attachment to a portion of a vehicle wheel and two vehicle-side bearing elements for articulated attachment to a portion of the vehicle body. The wheel-side bearing element is connected by two connecting arms to the vehicle-side bearing elements. The respective connecting arm is formed in such a way that, in its central longitudinal portion, it has a thickness that is greater than in longitudinal portions located in front of and behind the central longitudinal portion, the thickness being measured in a vertical direction of the vehicle. In addition, the respective connecting arm, in the central longitudinal portion, has a width that is smaller than in the longitudinal portions located in front of and behind the central longitudinal portion, the width being measured in a longitudinal direction of the vehicle. The transverse link is produced using a fibre braiding saturated with synthetic resin, the braiding being wound onto the wheel-side bearing element and the vehicle-side bearing elements. The fibre braiding is placed here according to a first manufacturing variant in a groove of a mould, the groove corresponding to the desired shape of the connecting arms, and pressed into the groove by using a roller. A second manufacturing variant, on the other hand, provides for the use of templates, which are arranged in accordance with the desired shape of the connecting arms. The synthetic resin is hardened in the two manufacturing variants by applying heat. The production of this known transverse link is very time-consuming and expensive owing to the winding on of the fibre braiding.

SUMMARY OF THE INVENTION

The present invention is based on the object of disclosing a further transverse link of the type mentioned at the outset, which, with an adequate component strength and flexural rigidity, has a relatively low weight and can be produced easily and economically.

The transverse link according to the invention is pivotable on at least two of its bearing elements about a common pivot axis or about pivot axes running substantially coaxially with respect to one another, these at least two bearing elements being connected by a single-shell connecting element, which has at least two connecting arms, to at least one bearing element having a ball and socket joint bearing. The bearing elements and the connecting element are elements of an integral plastics material moulded part. According to the invention, the integral plastics material moulded part is produced by extruding, in particular by impact extruding plastics material containing fibres, the bearing elements having bearing bushes or bearing shells surrounded in a material-uniting manner by extrusion of the plastics material, the ball and socket joint bearing having a bearing bush or a shell-shaped sliding capsule, which is produced from plastics material and connected in a material-uniting manner to the connecting element, the connecting element comprising a centre or transverse web connecting the bearing elements, and at least one edge web, which is connected to the centre or transverse web and, with the latter, defines an angle, preferably substantially a right angle.

The transverse link according to the invention may, in particular, be what is known as a triangular link.

The transverse link according to the invention, because of its material, has a relatively low weight. In particular, the production of the transverse link by extrusion allows various regions of the transverse link to be configured with a different web thickness so the transverse link can be optimally designed for the dynamic loads occurring during driving operation. The fibres integrated in the plastics material bring about a high component strength and flexural rigidity of the transverse link. In addition, the profile-shaped structure of the connecting element contributes to a high component strength and flexural rigidity. In particular, the transverse link according to the invention can be economically produced in large piece numbers by means of a preferably one-step pressing process, in which bearing bushes and/or bearing shells are placed in the press mould and the plastics material containing fibres flows around them during the extrusion. The fibre-reinforced plastics material used to produce the transverse link according to the invention may be thermosetting plastics or thermoplastics material.

During extrusion, the fibre-reinforced plastics material of the transverse link flows around the sliding capsule (bearing shell) of the ball and socket joint bearing and is connected thereto in a material-uniting manner. The plastics material of the sliding capsule is matched to the fibre-reinforced plastics material of the transverse link. A special feature of the present invention is thus that the introduction of the ball and socket joint is integrated into the one-step pressing process and therefore a subsequent pressing in of a ball and socket joint into the transverse link is dispensed with. This allows the production or assembly costs of the transverse link to be further reduced.

According to a particularly preferred embodiment, the transverse link according to the invention is produced from an SMC semi-finished product. SMC (sheet moulding compound) is foil-shaped or plate-shaped pressing mats made of thermosetting reaction resins and glass fibres. Polyester or vinyl ester resins are used, for example, as the reaction resins. The glass fibres typically have a fibre length in the range of 20 mm to 60 mm and are preferably present in the SMC semi-finished product in mat form. These pressing mats (resin mats) additionally typically contain fillers, preferably calcium carbonate and/or rock flour, as well as further additives, in particular additives for shrinkage reduction. Moreover, the SMC semi-finished products may contain inhibitors, inert release agents, peroxides as accelerators or reactants, dye, flame retardants and/or conductive additives. The components of SMC semi-finished products are present in these premixed and ready for further processing. The SMC semi-finished product can be cut into the desired sizes or outlines and further processed by means of extrusion to form the finished component (transverse link). During the pressing, the bearing bushes and/or bearing shells can already be placed in the compression mould. As a result, the transverse link according to the invention can be produced particularly economically. The fillers are used for weight and cost reduction.

The press being used to further process the SMC semi-finished product (resin mat) has heated moulds. The resin mat is divided into corresponding mat pieces depending on the size and geometry of the transverse link to be produced and arranged according to a defined insertion plan in the press mould. In the closing phase of the press, the resin mat or resin mats are distributed by flowing in the mould. Three-dimensional geometries with different wall or web thicknesses can thus be easily and reliably produced in only one process step. After a hardening time of about 30 seconds to several minutes at temperatures in the range from about 120° C. to 160° C., the duration of the hardening and the level of the hardening temperature depending on the component thickness and the reaction resin used, the finished component (transverse link) can be removed from the opened moulding component. Reaction resins of the type, which give the finished, hardened chassis component a temperature resistance up to at least 95°, are preferably selected for the production of the chassis component according to the invention.

Alternatively or in addition to glass fibres, the plastics material matrix of the transverse link according to the invention may also contain other reinforcing fibres, for example carbon fibres, ceramic fibres, aramid fibres and/or nylon fibres.

A preferred embodiment of the transverse link according to the invention provides that the connecting element has at least two edge webs projecting from the centre or transverse web. A high degree of flexural rigidity of the transverse link with a low component weight can be achieved by this embodiment.

With regard to a high flexural rigidity and as low a weight as possible of the transverse link, it is furthermore favourable if, according to a preferred development of the aforementioned embodiment, the edge webs are configured with a different wall thickness, the wall thickness of the thicker edge web being at least 1.1 times, preferably at least 1.2 times, the wall thickness of the thinner edge web.

A further advantageous embodiment of the transverse link according to the invention is characterised in that the connecting element has at least two edge webs projecting from the centre or transverse web and at least one rib running in between, the at least one rib being integrally formed on the centre or transverse web and extending at least over a partial length of the edge webs along the latter. A particularly high degree of flexural rigidity of the transverse link with a low component weight can be achieved by this embodiment.

With regard to a high degree of flexural rigidity of the transverse link with a low component weight, it is furthermore advantageous if the spacing of the at least one rib from the thicker edge web is smaller by at least 10%, preferably by at least 20%, than the spacing of the rib from the thinner edge web.

A further preferred embodiment of the transverse link according to the invention is characterised in that the rib has a height that is smaller than the height or equal to the height of the at least one edge web projecting from the centre or transverse web of the connecting element. The flexural rigidity of the transverse link with a relatively low component weight can also be improved by this embodiment.

With regard to a low component weight and a high dynamic loading capacity of the transverse web, a particularly preferred configuration of the invention provides that the two-armed connecting element connecting the bearing elements of the transverse link has a throat web connecting the connecting arms to one another, said throat web being arranged on the bearing element having the ball and socket joint bearing.

A further preferred configuration of the transverse link according to the invention, in this connection, consists in that the throat web passes integrally into the bearing element. As a result, the flexural rigidity of the transverse link is further improved in the region of the bearing element or its wheel-side ball and socket joint bearing. It is also advantageous in this regard if the throat web is provided, according to a further preferred embodiment of the invention, with an edge web integrally formed on, which, with the throat web, defines substantially a right angle. The height of the edge web integrally formed on the throat web, in a further embodiment of the link according to the invention, is preferably smaller here than the height or equal to the height of the edge web projecting from the centre or transverse web of the connecting element.

A further advantageous embodiment of the transverse link according to the invention is characterised in that the bearing elements, which define a common pivot axis or pivot axes running substantially coaxially with respect to one another, are in each case provided with a bearing bush made from a metal-rubber composite material and/or a plastics material-rubber composite material. This allows an optimal mounting of the transverse link, in particular a reliable mode of functioning at a high dynamic loading.

Furthermore, an advantageous embodiment of the transverse link according to the invention consists in that a collar is configured on the at least one further bearing element, said collar having at least one annular groove and/or at least one radially projecting projection for the positive attachment of a sealing sleeve. This allows an easy and reliable fastening of a seal protecting the bearing element from soiling and/or abrasive loading to be achieved on the transverse link.

A further advantageous embodiment of the transverse link according to the invention is characterised in that the latter has body regions with a different fibre-filler weight proportion ratio, a different synthetic resin-filler weight proportion ratio and/or a different fibre configuration, in particular fibre length. For example, the fibre weight proportion in the region of the bearing elements may be greater than in the region of the centre or transverse web of the connecting element. The filler weight proportion in the region of the centre or transverse web of the connecting element may, for example, also be greater than in the region of the bearing elements. This embodiment allows a load-optimised, made-to-measure configuration of the transverse link according to the invention to be further improved.

BRIEF DESCRIPTION OF THE DRAWINGS

The invention will be described in more detail below with the aid of drawings showing a plurality of embodiments. In the drawings.

DESCRIPTION OF THE INVENTION

Figure 1:
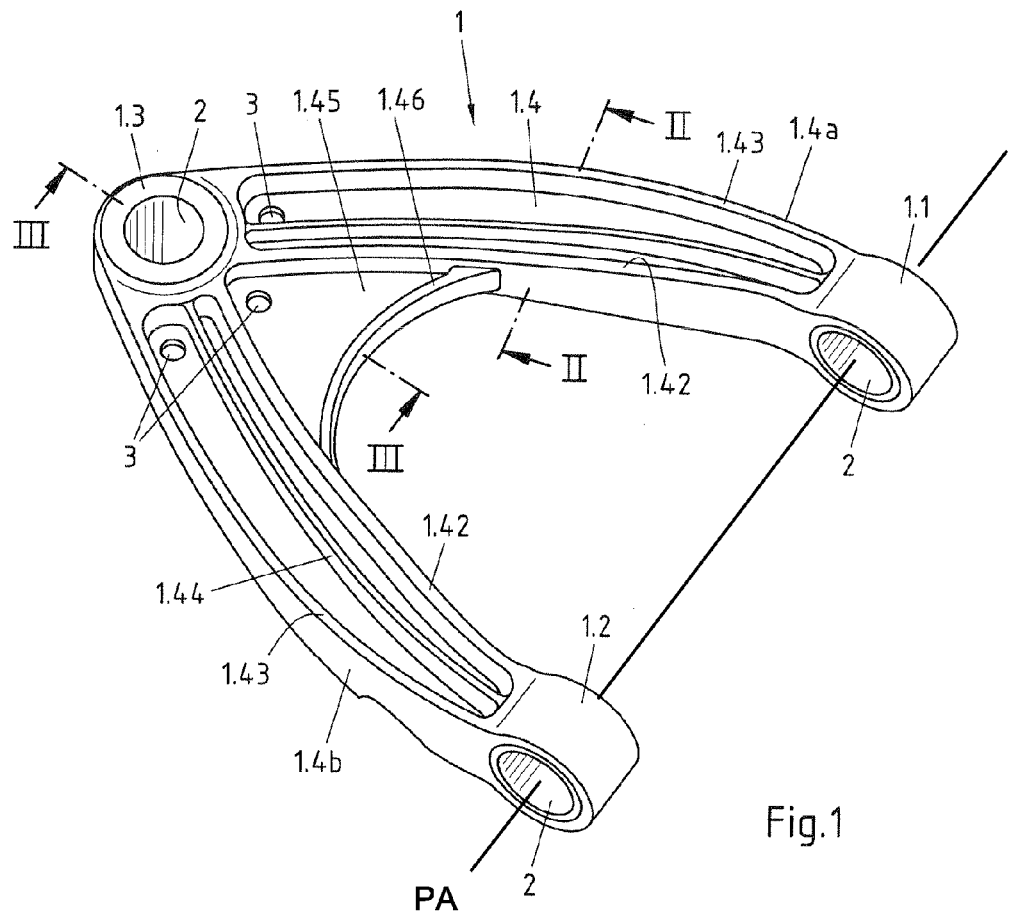
FIG. 1 shows a transverse link according to the invention in a perspective view.
Figure 2:
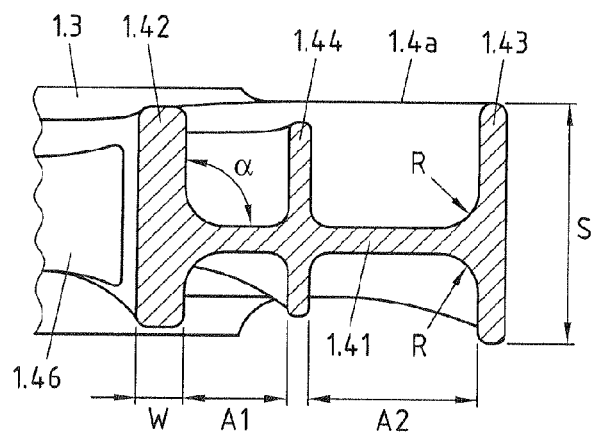
FIG. 2 shows a sectional view of a portion of the transverse link along the line II-II in FIG. 1.
Figure 3:
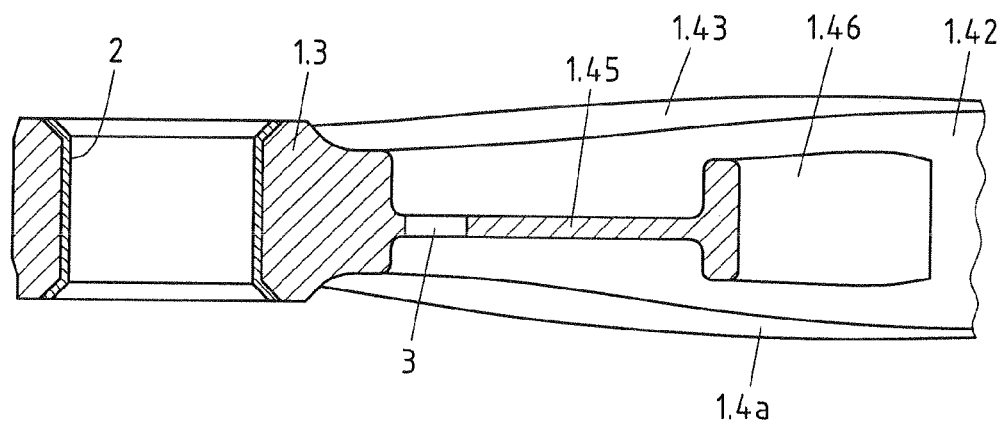
FIG. 3 shows a sectional view of a portion of the transverse link along the line III-III in FIG. 1.

FIGS. 1 to 3 show a first embodiment of a transverse link 1 according to the invention for a wheel suspension of a motor vehicle. The transverse link 1 has two crossmernber-side bearing elements 1.1, 1.2 and a steering knuckle-side bearing element 1.3, which are connected to one another by a single-shell connecting element 1.4. The bearing elements 1.1, 1.2, 1.3 are bush-shaped in each case and have a through-opening. The through-openings of the crossmember-side bearing elements 1.1, 1.2 define a common pivot axis (PA). Alternatively, the transverse link 1 may also be configured in such a way that the crossmember-side bearing elements 1.1, 1.2 are pivotable about axes running substantially coaxially with respect to one another. The through-opening of the steering knuckle-side bearing element 1.3 runs transversely or perpendicularly to the respective longitudinal centre axis (pivot axis) of the steering knuckle-side bearing elements 1.1, 1.2.

The bearing elements 1.1, 1.2, 1.3 and the connecting element 1.4 are elements of an integral plastics material moulded part, which is produced by extrusion, in particular by impact extrusion, of thermoplastic or thermosetting plastics material containing fibres. The bearing elements 1.1, 1.2, 1.3 comprise bearing bushes 2 (9, 10, 11 cf. FIG. 6) made of plastics material and/or metal. To produce the transverse link 1, the bearing bushes 2 are placed in a divided compression mould (not shown), into which a premixed moulding material of thermoplastic synthetic resin or thermosetting reaction resin (synthetic resin) and reinforcing fibres, preferably glass fibres, is also introduced. The moulding material is a semi-finished product and, apart from the thermoplastic or cross-linkable synthetic resin and the reinforcing fibres, preferably also contains mineral fillers. Furthermore, the semi-finished product (fibre-reinforced synthetic resin-filler mixture) can also contain additives, for example additives for shrinkage reduction, inhibitors, peroxides, flame retardants and/or dyes. The fibres, preferably glass fibres, have a fibre length in the range from 20 mm to 60 mm, preferably in the range from 25 mm to 50 mm, and may be present in mat and/or woven fabric form in the semi-finished product. The semi-finished products being used as the moulding material are plate-shaped, foil-like or mat-like.

The further processing of the moulding material, present for example in the form of a resin mat, takes place in a heated compression mould. The moulding material (resin mat, resin film or resin plate), depending upon the geometry of the cavity of the compression mould or the size and geometry of the link to be produced, is cut to size into precisely defined portions and placed in the mould cavity in accordance with a defined insertion plan.

By closing the compression mould, the moulding material is distributed in the mould cavity by extrusion and substantially completely fills the closed mould cavity—except for the through-openings of the bearing bushes inserted into the mould. The moulding material flows around the bearing bushes 2 on closing the compression mould so they are finally surrounded in a material-uniting manner in the bearing elements 1.1, 1.2, 1.3 of the transverse link 1. As an alternative or in addition to bearing bushes 2, bearing shells 5 can also be embedded in this way in a material-uniting manner in the transverse link 1 (cf. FIGS. 3 and 4).

A ball and socket joint bearing (not shown in FIG. 1) can be inserted into the bearing bush 2 provided in the bearing element 1.3. A joint shell of the ball and socket joint bearing or parts of a joint-shell of this type can be provided with fastening elements, for example latching elements, for positive and/or non-positive connection to the bearing bush 2.

The connecting element 1.4 of the transverse link according to the invention comprises a centre or transverse web 1.41 connecting the bearing elements 1.1, 1.3 and 1.2, 1.3 and at least one edge web 1.42 and 1.43, respectively, which is connected to the centre or transverse web 1.41 and defines therewith an angle (α), preferably substantially a right angle.

In the embodiment shown in FIGS. 1 to 3, the connecting element 1.4 has two arcuate connecting arms 1.4a, 1.4b, which respectively integrally pass at one of their ends into one of the crossmember-side bearing elements 1.1, 1.2 and integrally pass into the steering knuckle-side bearing element 1.3 at their other end. This transverse link is therefore substantially V-shaped or U-shaped, viewed as a whole.

Viewed in cross section, the respective arm 1.4a, 1.4b of the transverse link 1 preferably has a double-T profile. Alternatively, the respective connecting arm 1.4a, 1.4b may also have an I-profile or H-profile.

A rib 1.44 is preferably integrally formed on the transverse or centre web 1.41 between the outer edge web 1.43 and the inner edge web 1.42 of the I, double-T or H profile. The edge webs 1.42, 1.43 and optionally the rib 1.44 extend from the crossmember-side bearing elements 1.1, 1.2 continuously up to the steering knuckle-side bearing element 1.3.

The inner edge web 1.42 is preferably configured with a greater wall thickness than the outer edge web 1.43. The wall thickness W of the inner edge web 1.42 may be a maximum of 3 times the wall thickness of the outer edge web 1.43. Furthermore, the web heights S are between 2 and 10 times the wall thickness W of the inner or thicker edge web 1.42. The transverse or centre web 1.41 is thinner than the inner or thicker edge web 1.42. The height S of the thinner or outer edge web 1.43 is greater, at least in one or more portions, than the height of the thicker or inner edge web 1.42 (cf. FIGS. 2 and 3).

The rib 1.44 is arranged significantly closer to the thicker or inner edge web 1.42 than to the thinner or outer edge web 1.43. The spacing A1 of the rib 1.44 from the thicker or inner edge web 1.42 is smaller by about 15% to 25% than the spacing A2 of the rib 1.44 from the thinner or outer edge web 1.43.

A stiffening is provided adjacent to the steering knuckle-side bearing element 1.3. The stiffening is formed from a throat web 1.45, which connects the arcuate connecting arms 1.4a, 1.4b or the inner edge webs 1.42 to one another. The throat web 1.45 passes integrally into the inner edge webs 1.42 of the connecting arms 1.4a, 1.4b. The throat web 1.45 moreover also passes integrally into the steering knuckle-side bearing element 1.3 of the transverse link 1. The throat web 1.45 is preferably also provided with an integrally formed-on edge web 1.46. The edge web 1.46 projects substantially at a right angle in relation to the throat web 1.45. The cross-sectional profile of the stiffening formed from the throat web 1.45 and the edge web 1.46 therefore substantially corresponds to a T-profile. 3 designates holes, which allow a discharge of water out of the regions of the transverse link 1 surrounded by the edge webs 1.43, 1.42, 1.46.

The edge web 1.46 has a significantly greater wall thickness than the throat web 1.45. The wall thickness of the edge web 1.46 is preferably 1.5 to 3 times the wall thickness of the throat web 1.45. The height of the edge web 1.46 decreases toward the centre axis of symmetry (=section line III-III in FIG. 1) of the V-shaped transverse link 1. The edge web 1.46 can however also be configured with a constant web height. Furthermore, it can be seen in FIGS. 1 and 3 that the edge web 1.46 of the throat web 1.45 has a web height that is smaller than the height of the inner edge web 1.42 of the respective connecting arm 1.4a, 1.4b. Alternatively, however, a configuration is also within the scope of the invention, in which the edge web 1.46 of the throat web 1.45 has a web height that is equal to the web height of the inner edge web 1.42 of the respective connecting arm 1.4a, 1.4b. The edge web 1.46 is concavely curved. The throat web 1.45 with the edge web 2.46 extends over a specific length of the respective connecting arm 1.4a, 1.4b, which is approximately in the range of 20% to 40% of the total length of the respective connecting arm 1.4a, 1.4b.

Figure 4:
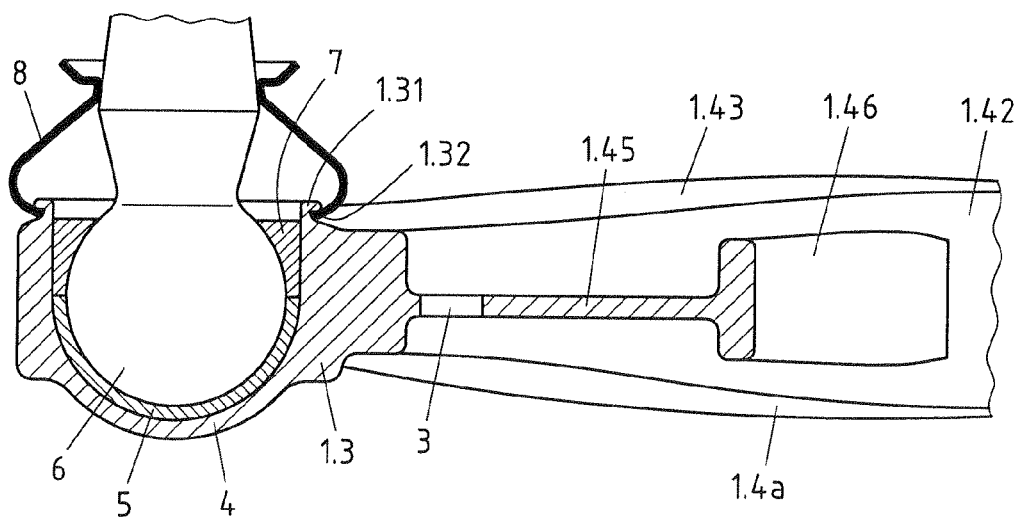
FIG. 4 shows an embodiment of a transverse link according to the invention in a sectional view of a transverse link portion, similar to FIG. 3.

A particularly preferred embodiment of the steering knuckle-side bearing element 1.3 of the transverse link 1 according to the invention is shown in FIG. 4. This embodiment differs from the embodiment according to FIGS. 1 to 3 in that the steering knuckle-side bearing element 1.3 does not comprise a bearing bush 2 having a through-opening, but is configured as a ball and socket joint bearing 4. The eye 1.3 of the ball and socket joint 4 is produced from the same material as the connecting element 1.4 or the connecting arms 1.4a, 1.4b and the other bearing elements 1.1, 1.2 of the transverse link 1. It is integrally connected to the connecting arms 1.4a, 1.4b and the throat web 1.45.

A bearing shell or shell-shaped sliding capsule (bearing shell) 5 is embedded in a positive and material-uniting manner in the bearing element 1.3, a ball and socket joint head 6 being seated in said bearing shell. The ball and socket joint head 6 is furthermore held in the bearing element 1.3 by a ring or ring segments 7, the inside or insides of which are adapted to the shape of the ball and socket joint head 6.

To produce the embodiment of the transverse link 1 according to the invention shown in FIG. 4, the shell-shaped sliding capsule (bearing shell) 5 is positively attached, preferably clipped, onto the ball and socket joint head 6 before insertion into the mould. The sliding capsule (bearing shell) 5 is preferably produced from plastics material. During the extrusion, the fibre-containing, thermosetting plastics material of the transverse link 1 flows around the bearing shell 5 and connects in a material-uniting manner thereto. The plastics material of the bearing shell 5 is matched to the fibre-containing, thermosetting plastics material of the transverse link 1.

A collar 1.31, which has an annular groove 1.32 for the positive attachment of a sealing sleeve 8, is furthermore configured on the bearing element 1.3 of the transverse link 1.

Figure 5:
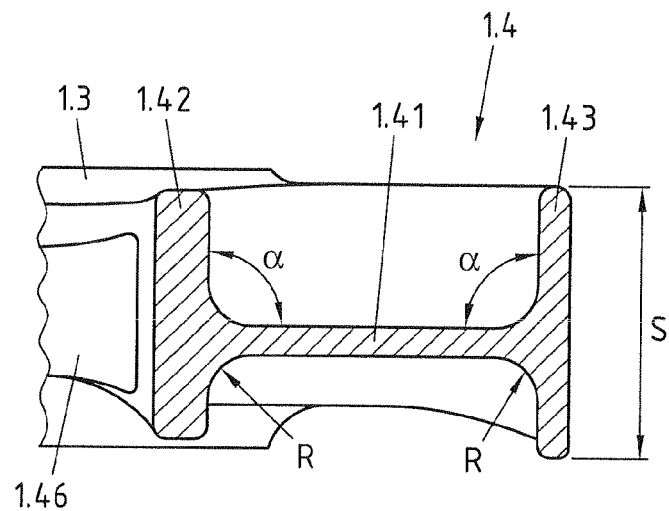
FIG. 5 shows a further embodiment of a transverse link according to the invention in a sectional view of a transverse link portion, similar to FIG. 2.

The embodiment according to FIG. 5 shows that the connecting element 1.4 or the arm 1.4a, 1.4b of the V-shaped transverse link 1 can also be configured without the rib 1.44 shown in FIGS. 1 and 2 (but otherwise as shown in FIG. 1). The configuration of the link 1 with one or more ribs 1.44 according to FIGS. 1 and 2 is optional and is particularly advantageous in the case of certain strength requirements.

Furthermore, it can be seen from FIGS. 2 and 5 that the throat region between the transverse or central web 1.41 and respective edge web 1.42, 1.43 is rounded. The radius R of the throat region is preferably larger than the wall thickness of the thinner or outer edge web 1.43.

Figure 6:
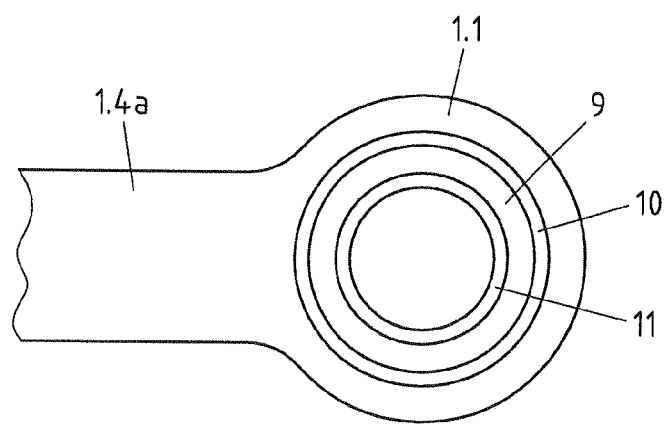
FIG. 6 shows a further embodiment of a portion of a transverse link according to the invention having a bearing element.

An embodiment of the transverse link 1 according to the invention is sketched in FIG. 6, in which the crossmember-side bearing elements 1.1 (and 1.2), which define a common pivot axis or pivot axes running substantially coaxially with respect to one another, are in each case provided with a bearing bush made of a metal-rubber composite material and/or a plastics material-rubber composite material. In this case, a bush-shaped rubber body 9 is arranged in a positive and/or material-uniting manner between bushes or casings 10, 11 made of metal, preferably steel, or plastics material, the outer bush or casing 10 being surrounded in a positive and material-uniting manner in the crossmember-side bearing element 1.1 (or 1.2) of the transverse link 1.

The execution of the invention is not limited to the embodiments described above or shown in the drawings. Rather, numerous variants are conceivable, which also make use of the invention disclosed in the accompanying claims in a configuration differing from the embodiments shown.

The present invention in particular also comprises a configuration, in which moulding materials with a different composition are used to produce the respective transverse link 1. The transverse link according to the invention, in this case, for example, has body regions with a different fibre-filler-weight proportion ratio, a different synthetic resin-filler weight proportion ratio and/or a different fibre properties, in particular a different fibre length. A tailor-made transverse link with optimal strength properties with a minimum weight can, in particular, be achieved by this configuration.

The invention claimed is:

1. A transverse link made of fibre-reinforced plastics material for a wheel suspension of a vehicle, which transverse link is pivotable on at least two of its bearing elements about a common pivot axis or about pivot axes running substantially coaxially with respect to one another, these at least two bearing elements being connected by a single-shell connecting element having at least two connecting arms to at least one further bearing element having a ball and socket joint bearing, the bearing elements and the connecting element being elements of an integral plastics material moulded part, wherein the integral plastics material moulded part is produced by extrusion of plastics material containing fibres, the bearing elements having bearing bushes or bearing shells surrounded in a material-uniting manner by extrusion of the plastics material, the ball and socket joint bearing having a bearing bush or a shell-shaped sliding capsule, which is produced from plastics material and is connected in a material-uniting manner to the connecting element, the connecting element comprising a centre or transverse web connecting the bearing elements, and at least one edge web, which is connected to the centre or transverse web and, with the latter, defines an angle, wherein the material of the bearing bushes or bearing shells is directly united with the plastics material surrounding the bearing bushes or bearing shells.

2. The transverse link according to claim 1, wherein the connecting element has at least two edge webs projecting from the centre or transverse web.

3. The transverse link according to claim 2, wherein the edge webs are configured with a different wall thickness, the wall thickness of the thicker edge web being at least 1.1 times the wall thickness of the thinner edge web.

4. The transverse link according to claim 3, wherein the connecting element has at least one rib running between the at least two edge webs, the spacing of the at least one rib from the thicker edge web is smaller by at least 10% than the spacing of the at least one rib from the thinner edge web.

5. The transverse link according to claim 3, wherein the connecting element has at least one rib running between the at least two edge webs, the at least one rib has a height, which is smaller than the height or equal to the height of the edge webs projecting from the centre or transverse web of the connecting element.

6. The transverse link according to claim 2, wherein the connecting element has at least one rib running between the at least two edge webs, the at least one rib being integrally formed on the centre or transverse web and extending at least over a partial length of the edge webs along the latter.

7. The transverse link according to claim 1, wherein the connecting element has a throat web connecting the connecting arms to one another, which throat web is arranged on the bearing element having the ball and socket joint bearing.

8. The transverse link according to claim 7, wherein the throat web passes integrally into the at least one further bearing element.

9. Transverse link according to claim 7, wherein the throat web is provided with an edge web that is integrally formed on and, with the throat web, defines substantially a right angle.

10. The transverse link according to claim 9, wherein the edge web of the throat web has a height, which is smaller than the height or equal to the height of the edge web projecting from the centre or transverse web of the connecting element.

11. The transverse link according to claim 1, wherein the bearing elements, which define a common pivot axis or pivot axes running substantially coaxially with respect to one another, are in each case provided with at least one of a bearing bush having a metal-rubber composite material and a plastics material-rubber composite material.

12. The transverse link according to claim 1, wherein a collar is configured on the at least one further bearing element, said collar having at least one of an at least one annular groove and at least one radially projecting projection for the positive attachment of a sealing sleeve.

13. The transverse link according to claim 1, wherein the latter has body regions with a different fibre-filler weight proportion ratio, a synthetic resin-filler weight proportion ratio, a different fibre configuration, or any combination thereof.

14. The transverse link according to claim 13, wherein the different fibre configuration is a different fibre length.

15. A method of manufacturing a transverse link according to claim 1, the method comprising:
producing the integral plastics material moulded part by extrusion of plastics material containing fibres to surround the bearing elements having bearing bushes or bearing shells in a material-uniting manner.

16. The method of claim 15, wherein the integral plastics material moulded part is produced by impact extrusion.

17. The method of claim 15, wherein at least one sheet moulding compound (SMC) semi-finish product and the bearing bushes or bearing shells are provided to a press, and wherein a resin of the SMC semi-finish product is distributed by flowing to surround the bearing elements.

* * * * *